Aug. 30, 1932.    H. W. NIEMAN    1,875,111
TENSION CONTROLLING DEVICE
Filed Sept. 12, 1929    4 Sheets-Sheet 1

Inventor
Henry W. Nieman.
By R. S. A. Dougherty
Attorney

Aug. 30, 1932.   H. W. NIEMAN   1,875,111
TENSION CONTROLLING DEVICE
Filed Sept. 12, 1929   4 Sheets-Sheet 2

Inventor
Henry W. Nieman
By R. S. C. Dougherty
Attorney

Aug. 30, 1932.      H. W. NIEMAN      1,875,111
TENSION CONTROLLING DEVICE
Filed Sept. 12, 1929      4 Sheets-Sheet 4

Inventor
Henry W. Nieman.
By R. S. C. Dougherty
Attorney

Patented Aug. 30, 1932

1,875,111

UNITED STATES PATENT OFFICE

HENRY W. NIEMAN, OF BETHLEHEM, PENNSYLVANIA, ASSIGNOR TO BETHLEHEM STEEL COMPANY, A CORPORATION OF PENNSYLVANIA

TENSION CONTROLLING DEVICE

Application filed September 12, 1929. Serial No. 392,054.

My invention relates to devices such as reels, winders and the like for textiles, paper, or for any other flexible material capable of being wound or unwound.

The primary purpose of this invention is to provide means for controlling the tension on the material during winding, unwinding or other manipulation.

It comprises a flexible friction device which is capable of exercising a controlled amount of torque on a reel, or equivalent winding or unwinding member, this torque being practically independent of variations of the coefficient of friction of the flexible friction device.

An understanding of the principles of my invention can probably be best obtained by first considering several illustrative embodiments thereof. Accordingly reference is made to the accompanying drawings.

Figure 1:
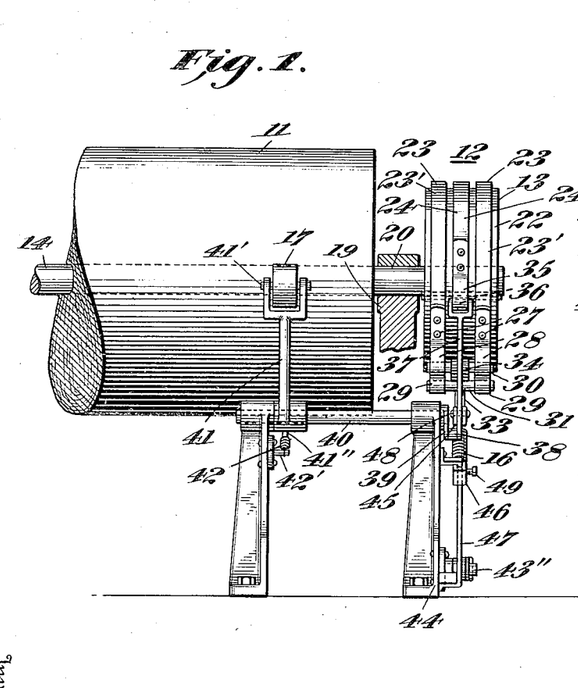
Fig. 1 is a longitudinal elevation of my mechanism where applied to unwinding.
Figure 2:
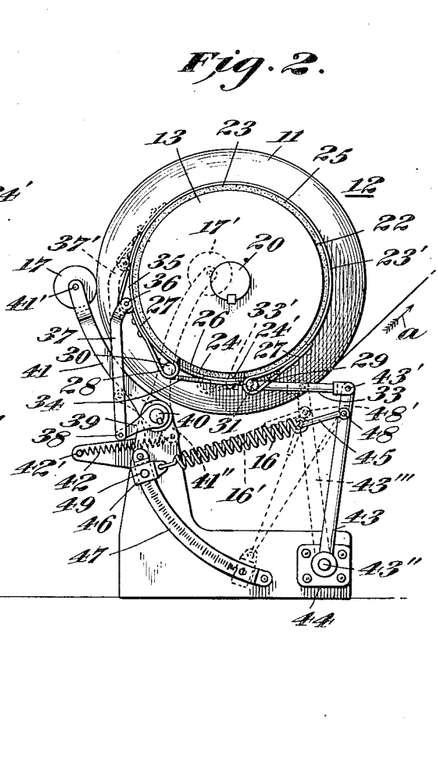
Fig. 2 is an end elevation of the same device.

In Figs. 1 and 2 is illustrated a device for maintaining a practically constant tension on the work whether such be a textile, paper or other material of similar flexible character, during the operation of unwinding. Here the material is drawn from the roll 11 in the direction indicated by arrow $a$, the rotation of the roll being resisted by the braking action of a flexible friction device 12, frictionally engaging the outer surface of drum 13, which latter is so mounted as to be turned with core 14 during the unwinding of the material thereon. The braking action of device 12 depends upon the pressure which it exerts upon drum 13, which pressure in turn depends upon a force applied at one end of device 12, tangentially of drum 13, this force being produced by tension spring 16 connected by linkage to this end of friction device 12. Means are provided for automatically lessening the pressure of device 12 on drum 13 as the roll of material diminishes in diameter, thereby to maintain a constant tension on the material as it leaves the roll. These means comprise a follower roll 17 in constant engagement with the roll of material and connected by linkage to the other end of friction device 12. As the roll of material diminishes in diameter the inward movement of follower roll 17, by means of the linkage, permits the circumferential movement of the friction device 12 with the result that the tension of spring 16 is reduced and thereby the braking action of device 12 lessened.

I will now describe in detail this embodiment of my invention.

Rotatably mounted in frame work 19 is shaft 20 of which core 14, carrying the roll of material 11, is a continuation. Fixed to this shaft is drum 13 having the cylindrical bearing surface 22. Wrappingly engaging this bearing surface is a friction band system 12 which I here designate a flexible friction device. This flexible friction device comprises two flexible bands 23 extending in spaced, parallel relationship the greater distance about drum 13, and a flexible band 24 between bands 23 and in spaced parallel relation thereto making a nearly complete turn about drum 13. These bands comprise flexible steel straps 23′ and 24′ provided with facings 25 and 26 respectively, of friction material, for engagement with the cylindrical bearing surface. The steel portions of bands 23 are bent upon themselves at their ends and united as indicated at 27 to form loops 28 and 29. Received in loops 28 are the ends of rod 30, and in the loops 29, at the other ends of bands 23 are ends of rod 31 secured to link 33.

Band 24 is provided with loops 34 and 35 at its ends, similar to the loops of bands 23, loop 34 pivotally embracing the intermediate portion of rod 30 and loop 35 pivotally embracing pin 36 on link 37 which form part of the linkage connecting friction device 12 with follower roll 17.

Thus it is apparent that the flexible friction device extends from its attachment to one end of link 33 about drum 13 and bands 23 for the greater part of a turn, thence through the intermediary of rod 30 to band 24 which extends nearly a complete turn about drum 22, terminating in its connection to the linkage connected to the follower roll 17.

Link 37 is pivoted at end 38 to crank 39 keyed to shaft 40 which is rotatably mounted in the frame work. Also keyed to shaft 40 is lever 41 which carries follower roll 17 pivotally mounted at the outer end of arm as at 41'. Tension spring 42, which is attached at one end 42' to the frame work is attached at its other end to arm 41'' of lever 41. This spring is adapted to keep follower roll 17 lightly pressing against the roll of material being unwound.

Link 33, which is connected at one end to the flexible friction device 12, is pivoted at its other end to end 43' of lever 43. This lever is pivoted at end 43'' to a portion 44 of the frame work. Pivoted at one end to an intermediate point 48 of lever 43 is link 45. Tension spring 16 is attached at one end to the outer end of link 45 and at the other end to member 46 which latter is slidably mounted on the graduated segment 47 mounted on the frame work. By means of the set screw 49 member 46 may be held in any desired position on segment 47.

Now assume a condition such as is shown in Fig. 2. The fabric or other flexible material is being pulled or drawn from a roll thereof in the direction indicated by arrow a to unwind the same. The pull on the material to unwind it is opposed by the braking action of friction device 12 on drum 13. Naturally the lessening radius of the roll of material as it unwinds tends to increase the tension on the material leaving the roll. In my mechanism this tendency of the tension to increase with lessening radius is compensated for by a gradual and automatic lessening of the braking action of the flexible friction device 12 on drum 13 in order that the tension on the material leaving the roll remain constant.

To produce this lessening of braking action of the friction device 12 on drum 13, I provide means responsive to the changing diameter of the roll of material to automatically vary the tension on spring 16 attached to one end of the flexible friction device. This spring 16 exerts a tangential pull on one end of device 12 thereby to produce a pressure of this friction device on the rotating drum 13, which pressure gradually diminishes in force from the end connected to the spring along the bands to the other end; the pressure of the flexible friction device being least at the end connected to link 37. Obviously, by varying the tension of spring 16 it is possible to vary the force of engagement of the flexible friction device with the drum 13, and thereby the braking action. As the diameter of the roll of material diminishes during the unwinding operation follower roll 17 moves inwardly toward core 14 in response to the action of tension spring 42. As it so moves lever 41 turns shaft 40 and with it crank 39 whereby link 37 is moved to permit a circumferential movement of friction device 12. This movement of device 12 is of course accompanied by a swing to the left, as viewed in Fig. 2, of lever 43 with a consequent reduction of tension in spring 16 which results in a reduction of pressure of device 12 on the drum and a lessening of the braking action.

In Fig. 2 the location of certain of the elements are represented in broken lines for the purpose of indicating the relationship of parts in what I call the "zero position". By the "zero position" I mean that state or relationship of parts when the roll is of null or zero diameter. During unwinding of the roll of material follower roll 17 approaches the broken line position 17'; link 37 connected to one end of device 12 approaches its broken line position 37'; link 33 connected to the other end of device 12 and lever 43 approach positions 33' and 43''' respectively; and spring 16 approaches position 16'. Of course there can be no actual "zero position" for the reason that the follower roll 17 can never reach the actual center of the roll since core 14 obviously has an appreciable diameter. Now, the dimensions of the part are so designed that the tension of spring 16 would be zero at the "zero position". In other words spring 16 would be just limp at the zero position, its tension being completely relieved, but with no slack, in this theoretical final position. It will be obvious that in all other positions the tension of spring 16 will be approximately proportional to the diameter of the roll of material. As a consequence, the resistant torque of friction device 12 on the roll core is proportional to the roll diameter and therefore the tension of the material leaving the roll remains constant.

By moving member 46 along segment 47 it is possible to obtain different tensions of spring 16 and thus to give the material leaving the roll the desired tension. Member 47 is a segment of a circle having as a center the point 48' which would be occupied by point 48 when the parts are in the "zero position". It should be further noted that the outer end of spring 16, that is the end which is attached to member 46, is movable in an arc of a circle which passes through pivot 43'' of lever 43, and whose center is point 48'. Obviously, with this relationship of parts, movement of member 46 along segment 47 does not alter the fact that spring 16 just loses its tension at the zero position, nor does it alter the fact that the spring exerts a force proportional to the diameter of the roll of material; but this movement along the segment does change the constant of proportionality and therefore the tension of the material leaving the roll may be varied within fairly wide limits. Having decided upon the particular tension desired in the material as it moves from the roll, member 46 is moved along segment 47 to the appropriate position and fixed in this position by means of set screw 49; following which adjustment the tension on the material will be automatically maintained constant, as has already been indicated.

It is now desired to indicate what is possibly the most important aspect of my invention. Although the mechanism which has just been described depends upon a friction device as an essential part in the regulation of the tension of the material to be unwound, it is so constituted and operated as to be practically independent of variations in the co-efficients of friction of the friction materials used in the braking mechanism. Numerous investigations have demonstrated that the co-efficient of friction of a material is not a constant value or one which varies but slightly, but that actually it is a quantity which alters greatly in service; frequently changing markedly in relatively short periods of time. Nevertheless, in spite of great variations in the co-efficient of friction the torque resistance exerted by the braking structure of the device just described is, for all practical purposes, independent of such variations.

To have this important property certain factors are important. First, note that the friction device 12 is flexible in the sense that under the conditions of use it will conform readily to the bearing surface 22 of drum 13. The flexible friction device may be said to wrappingly engage drum 13.

Next, note that one end of friction device 12 is connected to a relatively fixed member and the other end to means which exert a tangential force on device 12 to cause such device to press against drum 13 with a pressure diminishing progressively from such end. Of course, in saying that one end is connected to a relatively fixed member, the movement during the automatic adjustment of the pressure of friction device 12 is disregarded. Note further, and this is very important, that the tangential force applied at one end of device 12 is exerted in a direction counter to the relative movement of drum 13 during slippage.

Under the above conditions, the braking of drum 13 varies approximately as the product of the tangential force applied at 31 and the factor $$\left(1 - \frac{1}{e^{\mu\alpha}}\right)$$

in which ($e$) is the base of the natural system of logarithms, $\mu$ is the co-efficient of friction of the material of the facing, and $\alpha$ is the angle of wrap of device 12 expressed in radians, that is, the angle of engagement of device 12 with the bearing surface of drum 13.

From this it is apparent that the only influence of variations in the co-efficient of friction on the braking torque is in the quantity $\mu\alpha$. Now assume that the minimum co-efficient of friction is .35, even though the co-efficient may vary over a fairly wide range above this minimum, and assume that the angle of wrap of device 12 to be that which is indicated in Figs. 1 and 2, it is obvious that the quantity $$\frac{1}{e^{\mu\alpha}}$$

is a very small value, and the factor $$\left(1 - \frac{1}{e^{\mu\alpha}}\right)$$

will obviously be but little less than one. Therefore, this factor can have little effect upon the braking torque. The greater the co-efficient of friction the smaller the value of $$\frac{1}{e^{\mu\alpha}}$$

and the closer the approximation to unity of the factor $$\left(1 - \frac{1}{e^{\mu\alpha}}\right)$$

Therefore it is evident that no matter how great the variation of the co-efficient of friction above the minimum value given there will be but little alteration in the value of the torque.

Obviously I do not wish to be limited to a particular minimum co-efficient of friction. The important thing is that with my braking mechanism, designed and operated as given above, the product $\mu\alpha$ shall have a sufficient value to make $$\frac{1}{e^{\mu\alpha}}$$

negligible in an particular case, that is, negligible for the practical needs of any particular case.

It is probably unnecessary to state that for the needs of any particular situation one is not limited to any particular minimum co-efficient of friction as it is possible to use a greater angle of wrap.

But to obtain this result it is essential that spring 16 or equivalent force-exerting means be so connected to friction device 12 as to exert a tangential force counter to the relative motion of drum 13 during slippage. If, with material being unwound to rotate drum 13 in the direction shown in Fig. 2, the connections to the ends of device 12 were to be reversed, the results would be entirely different. Instead of variations in the co-efficient of friction having practically no effect such variations would actually be greatly magnified in the effect on the torque. The spring or equivalent force-exerting means must be arranged to exert a tangential force on the friction band system in a direction counter to the direction of movement of the drum.

My second illustration of my invention, shown in Figs. 3 to 9 inclusive, is a winder. This comprises the winding core 50 fixed to or integral with shaft 51; a power driven drum 52 rotatably mounted on shaft 51, a flexible friction device 53, frictionally engaging the inside of drum 52 and operatively connected to shaft 51 to communicate a torque thereto from the drum, and a torque regulating mechanism 54 having a part engaging the work on the reel adapted to move outwardly as the work on the reel increases, and parts responsive to such outward movement active to modify the engagement of the flexible friction device with the drum 52 to automatically regulate the torques communicated to the roll and to maintain a substantially constant tension on the work during winding.

Figure 6:
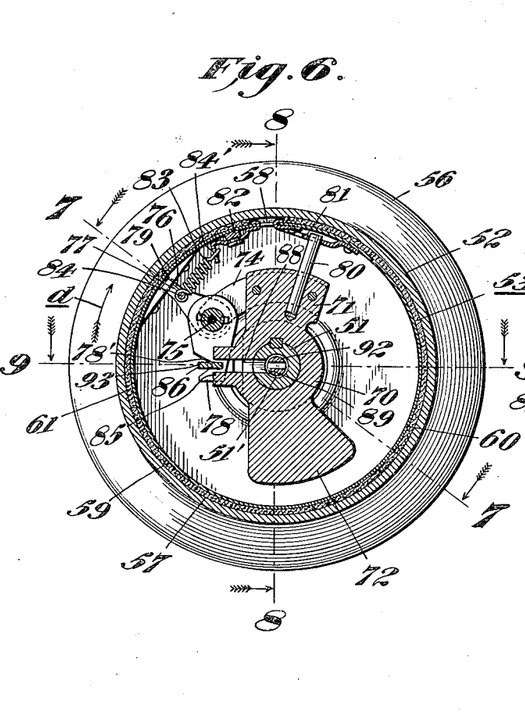
Fig. 6 is a cross sectional view of the drum and clutch mechanism used in the winding device, taken on the line 6—6 of Fig. 7.
Figure 7:
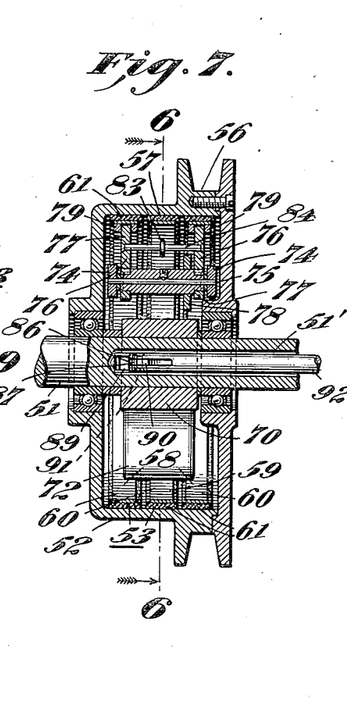
Fig. 7 is a cross section of the same taken on line 7—7 of Fig. 6.
Figure 8:
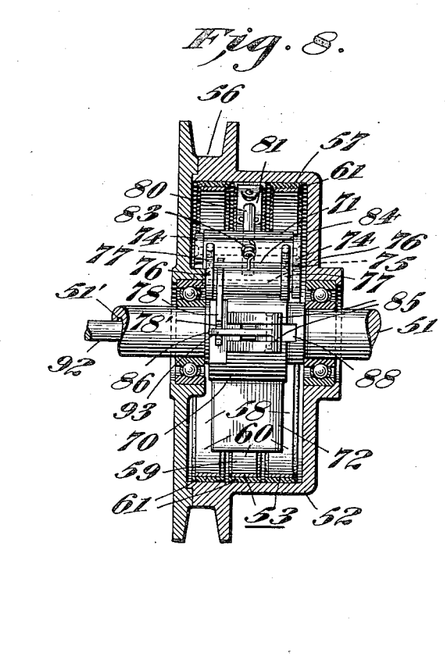
Fig. 8 is a cross section of the same taken on the line 8—8 of Fig. 6.
Figure 9:
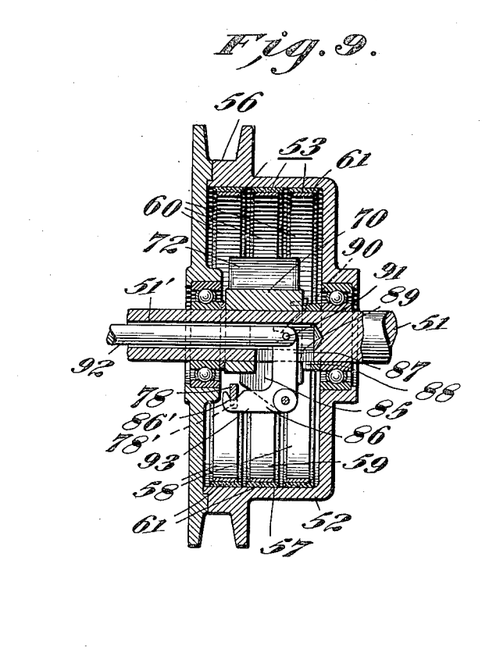
Fig. 9 is a cross section of the same taken on the line 9—9 of Fig. 6.

Shaft 51 is rotatably mounted in supports 55. Drum 52 is rotatably mounted on shaft 51. It is provided externally with a belt pulley portion 56 and is hollow internally to furnish an internal cylindrical bearing surface 57 adapted to be engaged by the friction elements of the flexible friction device 53.

Figures 3, 4, 5:
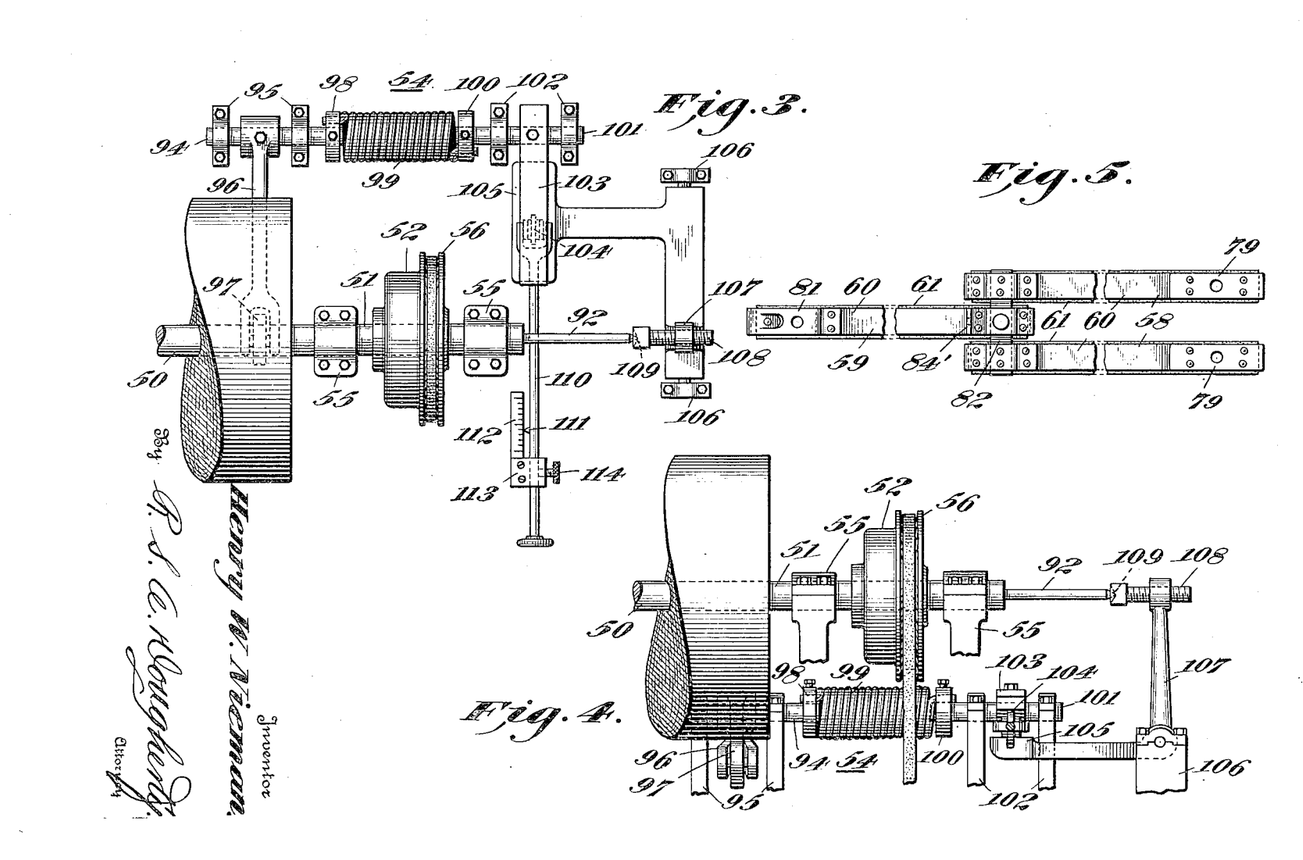
Fig. 3 is a plan view of a winding mechanism.
Fig. 4 is an elevation of the same.
Fig. 5 is a plan view of the flexible friction device which is used in this form of mechanism.

This flexible friction device comprises the spaced, parallel straps 58 and the intermediate strap 59 parallel to the others, and spaced therefrom. These straps are substantially the same in structure consisting of the flexible cylindrically curved, steel bands 60 provided with facings 61 of friction material for engagement with the bearing surface 57.

Keyed to shaft 51 is hub 70 provided with an extension 71, on one side, and a counter weight portion 72 on the opposite side.

Hub extension 71 carries two laterally-extending supports 74 in which is pivoted shaft 75 carrying bell crank lever 76. This lever comprises parallel arms 77 and an arm 78 angularly-disposed to arms 77. Parallel arms 77 are spaced apart and the outer end of each sets in a socket in a shoe 79 which is fixed to an end portion of each of straps 58. Hub extension 71 also carries a pin 80 which is received at its outer end in an opening of an end portion 81 of strap 59. The remaining end portions of straps 58 and 59 are connected to each other by means of bridge 82. Thus the straps of flexible friction device 53 wrappingly engage the inner cylindrical bearing surface of drum 52, straps 58 extending, as viewed in Fig. 6, from the connection to arms 77 in a counter-clockwise direction, nearly a complete turn, to bridge 82; thence strap 59 extending, in the same angular direction, nearly a complete turn to the connection with pin 80.

Spring 83 is connected at one end to pin 84 fixed to arms 77 and at its other end to an inwardly-extending portion 84' of the intermediate strap.

Pivoted to bracket 85, fixed to hub 70, is bell crank lever 86. Arm 87 of this lever extends through slots 88 and 89 of hub 70 and shaft 51, respectively, and engages through its hook end 90 pin 91 attached to the end of rod 92 in recess 51' of shaft 51. The other arm 93 of bell crank lever 86 has hooked end 86' which engages the hooked end 78' of arm 78 of bell crank lever 76. Rod 92 presses against one arm of bell crank lever 93, the other arm of which pulls on arm 78 of bell crank lever 76 and thereby causes the other arms 77 to exert a force on a flexible friction device 53 to press the straps thereof against the inner surface of drum 52. The force which rod 92 exerts varies with the amount of material on the reel and therefore the force with which the flexible friction device engages device 52 varies with the amount of work on the reel. The mechanism whereby rod 92 is actuated to this end will now be described.

Shaft 94, rotatably mounted in supports 95, carries fixed to it arm 96 at the outer end of which is rotatably mounted roller 97 which is adapted to lightly engage the work being wound on core 50. At one end of shaft 94 is fixed disc 98 which is attached to one end of torsion spring 99. The other end of this spring is attached to disc 100 fixed at one end of shaft 101 rotatably mounted in supports 102. Arm 103, fixed to one end of shaft 101 to turn therewith, is pressed by the action of spring 99 against roller 104 mounted on adjusting rod 110. Roller 104 is positioned between arm 103 and table 105 which is pivoted to supports 106. Fixed to table 105 is upwardly extending arm 107 provided at its upper end with bolt 108 in the head of which is a recess 109 adapted to receive the outer end of rod 92. This rod extends into recess 51' of shaft 51, its inner end operatively engaging arm 87 of bell crank lever 86 as previously described.

Adjusting rod 110 is mounted to slip in member 113 to which is attached scale 112, opposite which is mounted indicator 111 in adjusting rod 110. Rod 110 may be held in any desired position by means of set screw 114.

The operation of this device will be readily apparent. Assume a condition such as is indicated in Figs. 3 and 6. The fabric, or other flexible material, is being wound on core 50.

Obviously this is being effected because of the clutching of shaft 51, integral with core 50, to the power driven drum 52 by means of friction device 53 and the associated parts.

As is evident, the primary determinants for the maximum tension exerted on the material as it is being wound are the radius of the roll of material and the clutching torque between drum 52 and friction device 53. Given a particular radius there must clearly be a particular tension of the material which cannot be exceeded without the clutch slipping. In the absence of a compensating mechanism, however, the varying radius of the roll of material would likewise cause a corresponding variation in the maximum tension of the material. As the radius increased there would be a corresponding diminution in the tension required to cause slipping of the clutch. But I provide means for effecting a compensating action.

The clutching torque of friction device 53 varies with the pressure with which this device is pressed against the internal bearing surface 57 of drum 52, and this pressure of course depends upon the force applied to an end of friction device 53 by means of bell crank lever 76. Now the force which lever 76 exerts is dependent upon the radius of the roll of material. As the radius of the roll of material increases arm 96 is moved outwardly, turning shaft 94 and placing spring 99 under torsion which in turn exerts a torque on shaft 101, causing arm 103 to press downwardly upon table 105 through the intermediary of roller 104 and thereby exerting a pressure on rod 92 through the intermediary of arm 107.

The distinctive property of this winding device, as is also true of the unwinding mechanism first described, is its practical independence of variations of the co-efficient of friction. Here also it is essential that the force applied to one end of the friction device be in a direction counter to the relative movement of the drum during slippage. As indicated by arrow $d$ in Fig. 6 drum 52 is moving in a clockwise direction to drive shaft 51 and core 50 in the same direction. During slippage the motion of drum 52 relative to device 53 is in the direction of arrow $d$. It is also clear that the force applied to the end of device 53 by bell crank lever 76 is in the opposite direction to the relative movement of drum 52.

While the device described will maintain a practically constant tension on the material, as it is being wound, regardless of the variation in the radius of the roll of the material, means are provided whereby any desired tension may be secured. As is shown clearly in Figs. 3 and 4, arm 103 does not press directly on table 105. There is interposed roller 104, pivotally mounted at the end of rod 110 which slides in an opening in member 113 which is fixed to the frame work. By pushing or pulling rod 110 the position of roll 104 may be altered and the leverage of arm 103 correspondingly altered to vary the pressure exerted upon table 105 and therefore, in an obvious way, the pressure on the end of the friction device may be changed, to secure the desired tension.

I claim:

1. In a tension controlling mechanism, a first member, a second member having a reel or core portion, one of said members having a cylindrical bearing surface, a flexible friction device connected at one end to one of said members and wrappingly engaging the cylindrical bearing surface of the other of said members, and force-exerting means connected to the other end of the flexible friction device to exert a tangential force in a direction counter to the direction of rotation of the cylindrical bearing surface during slippage, the product of the minimum coefficient of friction of the friction device on the bearing surface and the angle of wrap being sufficiently great to render the reciprocal of said product of practically negligible value, whereby the net torque exerted by said friction device is practically independent of variations in the coefficient of friction, and means for automatically varying the torque exerted by the flexible friction device with varying radius of the roll of material on the core to maintain the tension on the material practically constant.

2. In a tension controlling mechanism, a first member, a second member having a reel or core portion, one of said members having a cylindrical bearing surface, a flexible friction device connected at one end to one of said members and wrappingly engaging the cylindrical bearing surface of the other of said members, force-exerting means connected to the other end of the flexible friction device to exert a tangential force in a direction counter to the direction of rotation of the cylindrical bearing surface during slippage, the product of the minimum coefficient of friction of the friction device on the bearing surface and the angle of wrap being sufficiently great to render the reciprocal of said product of practically negligible value, whereby the net torque exerted by said friction device is practically independent of variations in the coefficient of friction, and means for automatically varying said tangential force with varying radius of the roll of material on the core to maintain the tension on the material constant.

3. In a tension controlling mechanism, a first member, a second member having a reel or core portion, one of said members having a cylindrical bearing surface, a flexible friction device connected at one end to one of said members and wrappingly engaging the cylindrical bearing surface of the other of said members, and force-exerting means connected to the other end of the flexible friction device to exert a tangential force in a direction counter to the direction of rotation of the cylindrical bearing surface during slippage, the product of the minimum coefficient of friction of the friction device on the bearing surface and the angle of wrap being sufficiently great to render the reciprocal of said product of practically negligible value, whereby the net torque exerted by said friction device is practically independent of variations in the coefficient of friction, means for automatically varying the torque exerted by the flexible friction device with varying radius of the roll of material on the core to maintain the tension on the material practically constant, and means under the control of the operator to vary said tangential force for the purpose of obtaining a desired tension on the material being wound or unwound.

4. In an unwinding mechanism, a core member, a drum mounted to turn with said core member, a holding member, a flexible friction device wrappingly engaging said drum and connected at one end to said holding member, a resilient member fixed at one end and connected at its other end to the remaining end of said flexible friction device, means including a follower in constant engagement with the outside of the roll of material on the core member, connected to said holding member to effect movement of said holding member circumferentially of the drum as the roll of material diminishes in diameter, thereby to lessen the force of the resilient member with lessening radius of the roll of material on the core member.

5. In an unwinding mechanism, a core member, a drum mounted to turn with said core member, a holding member, a flexible friction device wrappingly engaging said drum and connected at one end to said holding member, a resilient member fixed at one end and connected at its other end to the remaining end of said flexible friction device, means including a follower in constant engagement with the outside of the roll of material on the core member, connected to said holding member to effect movement of said holding member circumferentially of the drum as the roll of material diminishes in diameter, thereby to lessen the force of the resilient member with lessening radius of the roll of material on the core member, and means for adjusting the force of the resilient member for the purpose of obtaining a desired tension on the material being unwound.

6. In a tension controlling mechanism, a first member, a second member having reel or core bearing portion, one of said members having a cylindrical bearing surface, a system of connected friction bands wrappingly engaging the cylindrical bearing surface and extending around it a plurality of turns in permanently spaced relationship, connected at one end to the other of said members, and force-exerting means connected at the other end of the band system to exert a tangential force thereon in a direction counter to the direction of rotation of the bearing surface, and means to vary said force in proportion to the radius of the roll of material on the core.

7. In a tension controlling mechanism, a core member, a drum fixed to rotate with said core member, a flexible friction device wrappingly engaging the drum, means attached to one end of the flexible friction device to exert a force thereon tangential to the drum, holding means attached to the other end of the flexible friction device, and means including a member in constant engagement with the roll of material, operatively connected to said holding means to move said holding means circumferentially along said drum and thereby to diminish the force of said tangential force-exerting means as the radius of the roll of material diminishes.

8. In a tension controlling mechanism, a core member, a drum fixed to rotate with said core member, a flexible friction device wrappingly engaging the drum, means attached to one end of the flexible friction device to exert a tangential force thereon in a direction counter to the direction of rotation of the drum in its motion relative to said friction device, holding means attached to the other end of the flexible friction device, and means, including a member maintained in constant engagement with the roll of material, operatively connected to said holding means to move said holding means circumferentially along said drum and thereby to diminish the force of said tangential force-exerting means as the radius of the roll of material diminishes.

9. In a tension controlling mechanism, a core member, a drum fixed to rotate with said core member, a flexible friction device including a system of flexible friction bands wrappingly engaging said drum for a plurality of turns in permanently spaced relationship, means attached to one end of the flexible friction device to exert a tangential force thereon counter to the direction of rotation of the drum in its motion relative to said friction device during slippage, holding means attached to the other end of the flexible friction device, and means including a follower in constant engagement with the roll of material, operatively connected to said holding means to move said holding means circumferentially along said drum and thereby to diminish force of said tangential force-exerting means as the radius of the roll of material diminishes.

10. In a tension controlling mechanism, a core member, a drum fixed to rotate with said core member, a flexible friction device wrappingly engaging the drum, means attached to one end of the flexible friction device to exert a tangential force thereon, holding means attached to the other end of the flexible friction device, means including a follower in constant engagement with the roll of material, operatively connected to said holding means to move said holding means circumferentially along said drum and thereby to diminish the force of said tangential force-exerting means as the radius of the roll of material diminishes, and means under the control of the operator for varying the force-exerting means attached to one end of the flexible friction device.

11. In a tension controlling device, a core member, a drum fixed to rotate with said core member, a flexible friction device wrappingly engaging the drum, a fixed member, a spring attached at one end to the fixed member and operatively connected to one end of said friction device, holding means attached to the other end of said flexible friction device, and means including a follower in constant engagement with the roll of the material, operatively connected to said holding means to move same circumferentially along the drum and thereby to diminish the force of said spring as the roll of the material diminishes.

12. In a tension controlling device, a core member, a drum fixed to rotate with said core member, a flexible friction device wrappingly engaging the drum, a fixed member, a spring attached at one end to the fixed member and operatively connected to one end of said friction device, holding means attached to the other end of said flexible friction device, means including a follower in constant engagement with the roll of the material, operatively connected to said holding means to move same circumferentially along the drum and thereby to diminish the force of said spring as the roll of the material diminishes, and means for varying the force of the spring.

13. In a tension controlling device, a core member, a drum fixed to rotate with said core member, a flexible friction device wrappingly engaging the drum, a fixed member, a spring attached at one end to the fixed member and operatively connected to one end of said friction device, holding means attached to the other end of said flexible friction device, means including a follower in constant engagement with the roll of the material, operatively connected to said holding means to move same circumferentially along the drum and thereby to diminish the force of said spring as the roll of the material diminishes, and means for altering the position of the fixed end of the spring for varying its force.

14. In a tension controlling mechanism, a first member, a second member having a reel or core bearing portion, one of said members having a cylindrical bearing surface, a system of connected friction bands wrappingly engaging the cylindrical bearing surface and extending around it a plurality of turns in permanently spaced relationship, connected at one end to the other of said members, and force-exerting means connected at the other end of the band system to exert a tangential force thereon in a direction counter to the direction of rotation of the bearing surface, means to vary said force as the radius of the roll of material on the core varies, and means under the control of the operator for varying said force.

In testimony whereof I hereunto affix my signature.

HENRY W. NIEMAN.